Patented Mar. 18, 1947

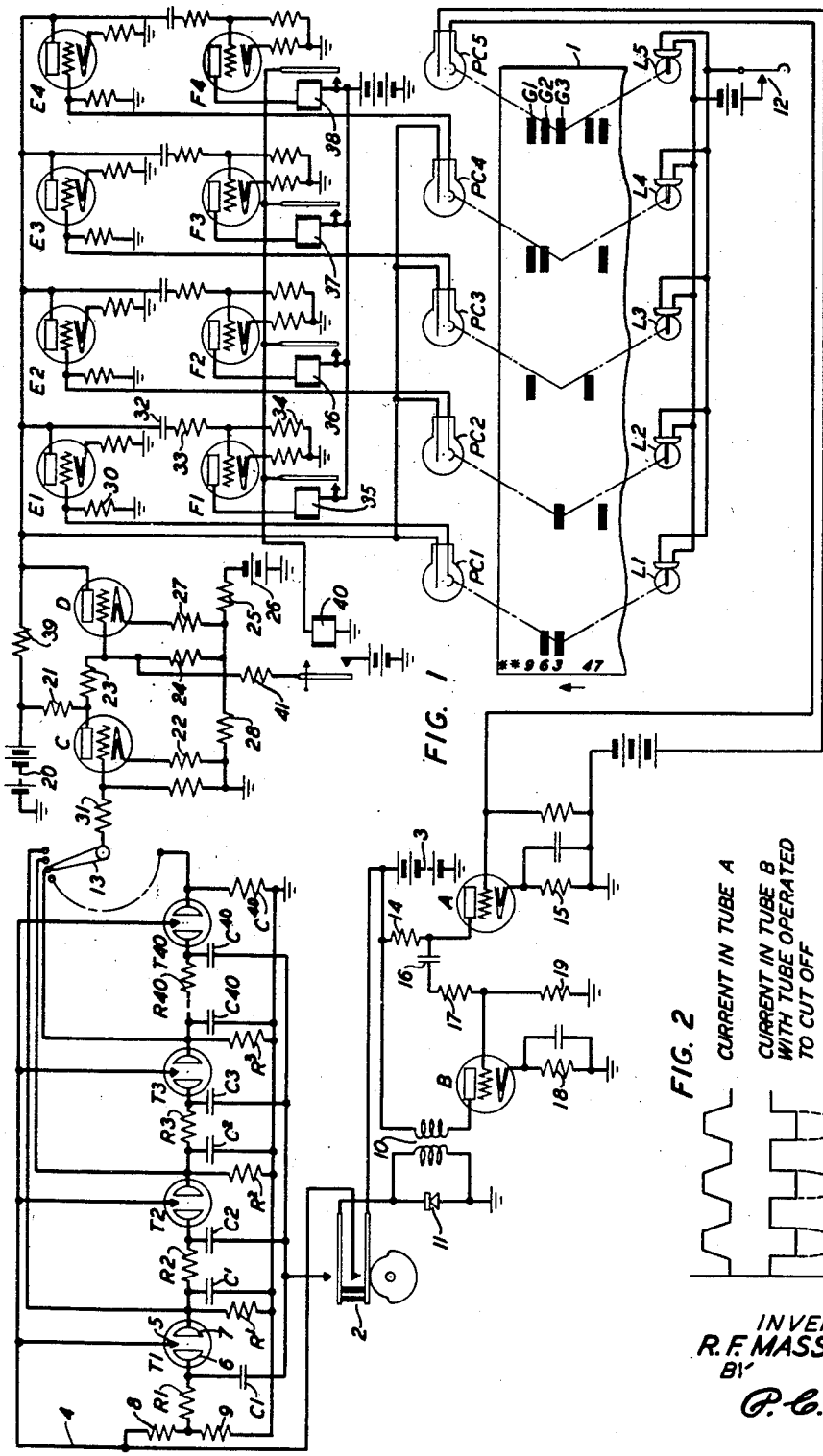

2,417,427

UNITED STATES PATENT OFFICE 2,417,427

COUNTING CIRCUIT

Robert F. Massonneau, Scarsdale, N. Y., assignor to Bell Telephone Laboratories, Incorporated, New York, N. Y., a corporation of New York Application August 21, 1943, Serial No. 499,579

9 Claims. (Cl. 175—320)

This invention relates to a gas tube counting circuit and more particularly to a counting circuit for use with a ticket sorting or recording circuit provided with photoelectric scanning equipment for scanning guide marks and sets of code marks on a toll ticket whereby the guide marks may be counted to cause any desired set of code marks to be scanned and a record made in response to such scanning.

It has been proposed to enable calling subscribers to control the establishment of connections to lines terminating in nearby toll areas by dialing the directory numbers of such lines. In such a system, in response to the initiation of a call, a connection is extended to a trunk which is equipped with a toll ticket printer. The ticket printer is thereafter controlled to print on a toll ticket all of the data required for billing the call to the calling subscriber, such as the directory numbers of both the calling and called subscribers, the rate to be charged for the initial period of conversation, the elapsed time of the conversation, the month, day, hour and fractional division of the hour when the call was made, etc. For a call forty data entries may be printed on the ticket. The ticket thus printed may be used by the commercial department of the operating company, in the same manner as the toll ticket usually prepared by the toll operator, to prepare a subscriber's monthly bill.

A further logical step in the development of an automatic ticketing system as just described would be the utilization of the printed ticket to automatically prepare the subscriber's bill. To utilize such printed tickets for billing on a bulk billing basis it would be necessary to scan them by a photoelectric scanner and to sort them in response to such scanning and to make registrations of the scanned entries for controlling computing and billing apparatus. Since the entries printed on the tickets by the ticket printer in the system just described are in numerical or character form, it has been proposed to print additional marks in code form on the tickets corresponding to each numerical or character item to better enable the functioning of a photoelectric scanner.

If such code marks are printed on a toll ticket to render the ticket scannable for sorting and other purposes, it then becomes desirable to direct the scanning equipment to select any preselected data on the ticket to be scanned. For example, for bulk billing it is first necessary to sort all of the toll tickets which have been printed during a billing period relating to calls made from all subscribers' lines of an office or a group of offices into stacks each appertaining to individual subscribers' accounts. This can be accomplished by examining the code marks printed on the ticket that are correlated to the digits of the office code and line number of the calling subscribers. Thus if the directory number of each subscriber's line comprises three office code digits and four numerical digits, to enable the tickets to be sorted into stacks appertaining to individual subscribers' accounts, the tickets would first be scanned to sort the tickets into stacks having the same first code digit. Each of such stacks would then be rescanned to sort them into stacks having the same first and same second code digits. These rescanning operations would then be repeated until after seven scannings, the tickets would be sorted into stacks individualized to subscribers' accounts. It might also be desirable to scan the tickets for segregating them in accordance with other data entries thereon.

It is therefore the object of the present invention to enable the data entries on each ticket to be counted as the ticket is advanced through the scanning apparatus and to render the photoelectric scanning means of the apparatus effective to cause a record to be made of only that one of the entries which has been selected for recording.

This object is attained in accordance with the present invention by the provision of guide marks printed on the toll ticket at the time the data entries and code marks corresponding thereto are printed, which guide marks are scanned by a photoelectric scanner and through the operation of an amplifier tube and an inverter tube, an impulse for each guide mark so scanned is generated. For counting the impulses a train of gas-filled tubes is provided one of the tubes being fired in response to each impulse. As many tubes are provided in the counting train as the maximum number of entries which may be printed on any toll ticket. The first tube of the train is normally primed for firing and when such tube fires in response to the scanning of the guide mark corresponding to the first item on the ticket, it primes the next tube in the train in readiness for firing in response to the scanning of the guide mark corresponding to the second item of information. In this manner the tubes are successively fired in response to the scanning of successive guide marks. Associated with the counting tubes is a manually operable multiposition switch, the switch arm of which is connected to the input circuit of an amplifier tube and the terminals of which are connected respectively to the cathodes of the counting tubes. Thus by the adjustment of the switch arm to any terminal position the operation of the amplifier tube may be controlled after any desired number of counting tubes has been fired, that is, in response to the counting of a corresponding number of guide marks on the ticket. The amplifier tube is effective through an inverter tube to render a group of photoelectric cells effective to scan the code marks on the tickets that are at that instant in the scanning position. The photoelectric tubes may then control the selective setting of a relay register in accordance with the code marks scanned to perform any desired function, as for example, the operation of a ticket sorter to direct the ticket to a particular stack or bin when it is released from the scanning apparatus.

For a clearer understanding of the invention reference may be had to the following detailed description taken in connection with the drawings in which:

Fig. 1 shows the circuit of the electronic counter; and

Fig. 2 illustrates in a graphic manner the current generated through tubes A and B and the nature of the voltage impulses which are applied for firing the tubes of the counter.

As previously stated it is proposed to print on each toll ticket, and in addition to the digital entries of the several items of information, code marks corresponding in code values to the numerical values of the entries and guide marks. As disclosed a four-element code may be used of the character employed for setting the registers of senders in telephone systems. Such a code is illustrated in the following table:

| Digit | Positions of printed code marks | | | |
|---|---|---|---|---|
| | 1 | 2 | 3 | 4 |
| 1 | x | | | |
| 2 | | x | | |
| 3 | x | x | | |
| 4 | | | x | |
| 5 | | | | x |
| 6 | x | | | x |
| 7 | | x | | x |
| 8 | x | x | | x |
| 9 | | | x | x |
| 0 | x | | x | x |

The tubes A, B, C, D, E1 to E4 and F1 to F4 are of the well-known vacuum type each having a control grid, a cathode and an anode. The cathodes may be heated by adjacent heater filaments which may be connected to any desired source of heater current either direct or alternating. Tubes A, C and E1 to E4 act as amplifiers and tubes B, D and F1 to F4 act as inverters.

For scanning the code marks and the guide marks on the tickets five photoelectric scanning units of the type which is designed to scan by reflected light are employed, each scanner comprising a photoelectric cell such as PC1, a source of illumination such as the lamp L1 and a lens tube (not shown) for focussing the light from the lamp upon the section of the ticket to be scanned. The photoelectric cell PC5 of the scanning unit which is positioned for scanning the guide marks is electrically associated with the control circuit of the amplifier tube A.

The counting tubes T1 to T40, inclusive, are gaseous conductor tubes filled with a low pressure gaseous content which may be neon, argon, helium, mercury vapor, or combinations of gases of this group. Each tube has a certain characteristic, namely, that the gaseous content will become ionized and thus conducting at a critical potential determined by the electrode design, the nature of the gaseous content and its pressure. After the tube becomes conducting the grid or control electrode no longer has any control over the current flowing over the cathode-anode path through the tube until the tube is extinguished either by opening the anode path or reducing the anode potential.

It will be assumed that the ticket 1 has been inserted into the scanning apparatus and that as a result of the ticket being in the apparatus the springs 2 have been cammed into their closed positions. With the lower pair of springs 2 closed, positive potential from the battery 3 is applied over such springs to conductor 4 and is thus applied to the anodes, such as 5, of all counting tubes T1 to T40, inclusive, and from the junction between the potential divider resistances 8 and 9 through resistance R1 to the control cathode 6 of the first tube T1 of the train of counting tubes. The potential thus applied to the left or control cathode 6 is not, however, sufficient to cause tube T1 to fire but does prime such tube for firing. It is to be noted that the right cathode of each tube is connected to the negative or grounded terminal of battery 3 through a resistance such as resistance R'. The closure of the upper pair of springs 2 connects the secondary winding of transformer 10, shunted by the varistor 11, through condensers, such as condenser C1, with the left or control cathodes of the counting tubes. It will also be assumed that the filament circuits of all of the vacuum tubes A, B, C, D, E1, F1—E4, F4 are closed for heating the cathodes of such tubes, that the key 12 has been operated to close the circuit for lighting the lamps L1 to L5, inclusive, of the scanning units and that the arm 13 of the selector switch has been set upon the third terminal of its associated terminal arc for directing the scanning apparatus to scan the third entry on the ticket being scanned.

Before the ticket has advanced to scan the first entry thereon the light beams directed against the surface of the ticket from the lamps L1 to L5, inclusive, are reflected to impinge against the photoelectric cells PC1 to PC5, inclusive, to illuminate such cells and to thereby reduce their resistances whereupon the potentials impressed upon the grids of tubes A, E1, E2, E3 and E4 are rendered more positive to increase the flow of anode current therethrough. With anode current flowing from the positive terminal of battery 3 through resistance 14, over the anode-cathode path through tube A and resistance 15 to ground, the potential applied from source 3, through resistance 14, condenser 16 and resistance 17 to the grid of inverter tube B becomes less positive and thereby the anode current flowing through tube B decreases. Thus as the anode current builds up in tube A as illustrated by the top curve in Fig. 2 the anode current in tube B drops abruptly as illustrated by the middle curve of Fig. 2 until the tube B reaches its cut-off condition. As the current decreases in the anode circuit of tube B the voltage applied from battery 3 through the primary winding of transformer 10 over the anode-cathode path through tube B and through resistance 18 to ground rises sharply in the negative sense thereby impressing a sharp rise of potential in a positive sense through the secondary winding of transformer 10, thence over the upper pair of contacts 2, through condenser C1 and resistances R1 and 9 to ground. As soon as condenser C1 becomes sufficiently charged the potential impressed by the impulse through the secondary winding of transformer 10 raises the priming potential previously applied through resistance R1 to the control cathode of tube T1 sufficiently to cause such tube to become conducting.

Tube T1 thereupon transmits current over its anode circuit extending from the source 3 connected to conductor 4, over the path through tube T1 from its anode 5 to its cathode 7, thence through resistance R' and condenser C' in parallel to ground. After an interval measured by the charging time of condenser C' the potential at the upper terminals of resistance R' and condenser C' becomes more positive and the potential applied through resistance R2 to the control cathode of the second counting tube T2 becomes more positive. Tube T2 thus becomes primed for firing but does not fire at this time. The interval introduced by the charging of condenser C' is of such duration that the tube T2 does not become primed for firing until after the termination of the impulse which fired the preceding tube T1.

When the ticket advances in the direction of the arrow to the position for scanning the first item thereon, guide mark G1 is interposed in the path of the light beam directed against the ticket from lamp L5 and reflected to impinge against the photoelectric cell PC5 thereby increasing the resistance of cell PC5 and making the potential of the grid of tube A less positive whereby the anode current flowing through tube A decreases. As the current flowing through tube A decreases more current flows from battery 3 through resistance 14, condenser 16 and resistances 17 and 19 and the potential applied to the grid of tube B becomes more positive thereby increasing the current flowing in its anode circuit and through the primary winding of transformer 10. As the current increases a voltage impulse is impressed in the negative direction through the secondary winding of the transformer which is attenuated by the varistor 11 connected in parallel with such winding. The lower curve of Fig. 2 illustrates the positive and attenuated negative voltage impulses generated in the second winding of transformer 10.

At the time the guide mark G1 is so interposed the code marks transversely aligned with such guide marks are interposed in the path of the light beams directed against the ticket from lamps L4 and L3 and reflected to impinge against the photoelectric cells PC4 and PC3 whereby the intensity of the light reaching the cells PC4 and PC3 is reduced. Since there are no code marks in alignment with the guide mark G1 interposed in the paths of the light beams directed against the ticket from lamps L1 and L2 such beams are reflected from the ticket and impinge with their full intensity upon the cells PC1 and PC2. With the cathodes of tubes C and D heated and the grids thereof biased from points on the potential divider extending from ground through resistances 28 and 25 to battery 26, the grid of tube C is not sufficiently positive with respect to the cathode thereof to cause a strong flow of anode current from source 20 through resistance 21 over the anode-cathode path through the tube and through resistance 22 to ground and consequently current of sufficient strength flows from the source 20 through resistances 21, 23, 24 and 25 and the source of grid biasing current 26 to raise the potential on the grid of tube D to a value sufficiently positive with respect to the potential applied to the cathode of tube D through resistance 27 to cause a strong anode current to flow from the source 20 over the anode-cathode path through tube D, resistance 27, and to the source 26. Tube D thus offers a low resistance shunt to the photoelectric cells PC1 to PC4, inclusive, which are connected through resistance 39 on one side to the positive terminal of source 20 and on their other side through resistances, such as 30, to ground. Accordingly, when the cells PC1 to PC4 become illuminated upon the insertion of the ticket into the scanner and before the ticket has advanced to scan the first item thereon, the increase of the resistances of such cells through their illumination does not result in an appreciable increase of the potential on the grids of tubes E1 to E4 with respect to the cathodes of such tubes.

When the ticket is again advanced to a position for scanning the next or second item thereon cell PC5 first becomes illuminated to cause an increase in the flow of anode current through tube A and a decrease in the flow of anode current through tube B and the illumination of cell PC5 then becomes decreased when the guide mark G2 becomes interposed in the beam of light directed from light L5 and reflected from the ticket to impinge on the cell PC5. When the cell PC5 thus becomes darkened the current flowing through tube A decreases and the current flowing through tube B increases.

In the manner previously described the cycling of tubes A and B causes the application of a positive potential impulse through the secondary winding of transformer 10 over the upper pair of contacts 2 through condenser C2, resistance R2, resistance R' to ground and when the condenser becomes charged the potential at the left or control electrode on tube T2 becomes raised sufficiently to cause such tube to fire. With tube T2 fired across its control gap current now flows from the source 3 connected to conductor 4, over the anode-cathode path through the tube and through resistance R¹ to ground and in parallel with resistance R² through condenser C². As soon as condenser C² becomes charged the potential applied through resistance R3 to the left or control cathode of tube T3 rises to prime the tube T3 but not to cause it to fire. In a similar manner as the ticket is advanced to scan successive items thereon, the tubes of the counting train are successively fired.

It has been assumed that the arm 13 of the selector switch has been set upon the No. 3 terminal of its arc and that therefore the firing of counting tubes T1 and T2 has been without effect upon the functioning of tubes C, D and that tubes E1 to E4 remain in their low conductive condition irrespective of the degree of illumination of the photoelectric cells PC1 to PC4, inclusive. When counting tube T3 fires, however, positive potential from conductor 4 over the cathode-anode path of tube T3 is applied over the switch arm 13 through resistance 31 to the grid of tube C thereby making the grid sufficiently positive with respect to the cathode of such tube to render the tube more highly conductive. As the conductivity of tube C is increased more current flows in the anode circuit thereof from the source 20 through resistance 21 over the anode-cathode path through the tube and resistance 22, thereby reducing the current flowing over the circuit previously traced from the source 20 through resistances 23 and 24 and thereby rendering the grid of tube D less positive with respect to the cathode of such tube. The conductivity of tube D is thereupon reduced thereby increasing its internal resistance.

With the resistance of tube D increased the potential impressed across each of the photoelectric cells PC1 to PC4 and the resistance 30 of the associated amplifier tube, such as tube E1 associated with cell PC1, is increased in strength. At this time the ticket will have been advanced into position for scanning the third item thereon in which position it will be noted that the digit 3 is printed and correlated code marks for such digit are printed for scanning by the Nos. 1 and 2 scanning units. With no code marks printed on the ticket for scanning by the Nos. 3 and 4 scanning units the photoelectric cells PC3 and PC4 are illuminated but with code marks printed in the position for scanning by the Nos. 1 and 2 scanning units the illumination of the cells PC1 and PC2 is reduced to such an extent that there is no material increase of current flowing from the source 20 through such cells at the time the resistance of tube D is increased and consequently no material increase of the potential applied to the grids of the associated amplifier tubes E1 and E2. Since, however, the cells PC3 and PC4 are illuminated and their resistance thereby decreased, current does flow from the source 20 through such cells of sufficient strength to increase the potential applied to the grids of the associated amplifier tubes E3 and E4. The conductivity of tubes E1 and E2 is therefore not increased but the conductivity of tubes E3 and E4 is increased.

Since at this time tube D is in a high resistance condition and tube E1 is also in a high resistance condition, current flows from the source 20 through condenser 32 and resistances 33 and 34 to ground of sufficient strength to charge condenser 32 to a point where the potential applied to the grid of tube F1 is sufficiently positive with respect to the potential on the cathode of such tube as to cause tube F1 to become conductive to operate the anode relay 35 associated with its anode circuit. Similarly, tube F2 causes the operation of its associated anode relay 36. However, since tubes E3 and E4 associated with the cells PC3 and PC4 have been rendered highly conducting and therefore the resistances in the anode circuits thereof have been reduced, the current flowing from battery 20 is shunted away from the input circuits of the associated tubes F3 and F4 and such tubes and their associated anode relays 37 and 38 remain unoperated. Thus the scanning of the selected items on the ticket has resulted in the operation of register relays 35 and 36 to register the digit 3 in the recorder.

The registration of the digit 3 may be employed for any desired purpose as, for example, to control the diversion of all tickets fed through the scanning apparatus which have a third office code digit 3 printed thereon into a particular stack or bin. Had the digit been other than 3 then the relays of the recorder register would have been operated in different combinations in accordance with the well-known operation of such a relay register group.

To prevent the scanning of subsequent items on the ticket the operation of the register relays may also establish the circuit of slow operate relay 40 which applies positive potential through resistance 41 to the grid of tube D to render it conducting so as to block any further functioning of the tubes E1 to E4.

After a ticket has been scanned with respect to a particular item thereon the switch 2 is opened when the ticket leaves the scanning apparatus thereby extinguishing any fired tubes of the counting train whereupon tubes C, D, E1, F1, etc., return to their normal condition and the apparatus is ready to scan another ticket with respect to the same item of information. When all tickets have been thus scanned the switch arm 13 may be advanced to another terminal position preparatory to scanning the ticket with respect to another item thereon.

As before stated, if it is desired to sort a stack of tickets in the group appertaining to individual subscribers' accounts the switch arm 13 will be first set in its first terminal position since the first item appearing on each ticket is the first code digit of the identification number of the subscriber who made the call for which the ticket was printed. The stack of tickets would then be scanned as previously described and a sorter associated with the scanning apparatus would be controlled to sort the tickets into stacks in accordance with the digital values of the first code digit. Following this sorting the switch arm 13 would be set to its second terminal position and the sorted stacks of tickets would then be rescanned resulting in the further sorting of each stack of tickets into stacks in accordance with the digital values of the second code digit. This scanning and sorting process would then be repeated until all of the tickets had been scanned with respect to the three office code digits and the four numerical digits of the calling line number printed thereon at which time the tickets appertaining to calls made by any calling subscriber would be segregated.

What is claimed is:

1. In a device for scanning a record on which are a plurality of sets of code marks and a guide mark associated with each of said sets, photoelectric scanners for scanning the several elements of the sets of code marks, a photoelectric scanner for successively scanning the guide marks, a train of electronic tubes successively rendered conductive in response to the scanning of successive guide marks, a switching means having its fixed terminals connected respectively to the output circuits of successive ones of said electronic tubes, responsive means, and means associated with the adjustable member of said switching means and operable from said train of tubes in accordance with the setting of said switching means for rendering the scanning of any desired set of code marks by said code mark scanners effective to selectively operate said responsive means.

2. In a device for scanning a record on which are a plurality of sets of code marks and a guide mark associated with each of said sets, photoelectric scanners for scanning the several elements of the sets of code marks, a photoelectric scanner for successively scanning the guide marks, a train of electronic tubes, means for generating an impulse in response to the scanning of each guide mark, means for rendering successive ones of said tubes conductive in response to successively generated impulses, a switching means having its fixed terminals connected respectively to the output circuits of successive ones of said electronic tubes, responsive means, and means associated with the adjustable member of said switching means and operable from said train of tubes in accordance with the setting of said switching means for rendering the scanning of any desired set of code marks by said code mark scanners effective to selectively operate said responsive means.

3. In a device for scanning a record on which are a plurality of sets of code marks and a guide mark associated with each of said sets, photoelectric scanners for scanning the several elements of the sets of code marks, a photoelectric scanner for successively scanning the guide marks, a train of electronic tubes, means for priming the first of said tubes upon the insertion of a record in said device, means for generating an impulse in response to the scanning of each guide mark, means for firing a previously primed tube and for priming the next succeeding tube in response to each successively generated impulse, a switching means having its fixed terminals connected respectively to the output circuits of successive ones of said electronic tubes, responsive means, and means associated with the adjustable member of said switching means and operable from said train of tubes in accordance with the setting of said switching means for rendering the scanning of any desired set of code marks by said code mark scanners effective to selectively operate said responsive means.

4. In a device for scanning a record on which are a plurality of sets of code marks and a guide mark associated with each of said sets, photoelectric scanners for scanning the several elements of the sets of code marks, a photoelectric scanner for successively scanning the guide marks, a train of electronic tubes, means for generating an impulse in response to the scanning of each guide mark to successively fire said gas-filled tubes comprising an amplifier tube whose input circuit is controlled by said guide mark photoelectric scanner, an inverter tube whose input circuit is associated with the output circuit of said amplifier tube, and a transformer whose primary winding is connected into the output circuit of said inverter tube and whose secondary winding is connected to the control cathode of each of said electronic tubes, a switching means having its fixed terminals connected respectively to the output circuits of successive ones of said electronic tubes, responsive means, and means associated with the adjustable member of said switching means and operable from said train of electronic tubes in accordance with the setting of said switching means for rendering the scanning of any desired set of code marks by said code mark scanners effective to selectively operate said responsive means.

5. In a device for scanning a record on which are a plurality of sets of code marks and a guide mark associated with each of said sets, photoelectric scanners for scanning the several elements of the sets of code marks, a photoelectric scanner for successively scanning the guide marks, a train of electronic tubes means for generating impulses comprising an amplifier tube whose input circuit is controlled by said guide mark photoelectric scanner, an inverter tube whose input circuit is associated with the output circuit of said amplifier tube, a transformer whose primary winding is connected into the output circuit of said inverter tube and whose secondary winding is connected to the control cathode of each of said electronic tubes, and a unilateral resistance connected in parallel with said secondary winding whereby an impulse of positive potential is generated in response to the scanning of each guide mark for operating successive ones of said electronic tubes, a switching means having its fixed terminals connected respectively to the output circuits of successive ones of said electronic tubes, responsive means, and means associated with the adjustable member of said switching means and operable from said train of electronic tubes in accordance with the setting of said switching means for rendering the scanning of any desired set of code marks by said code mark scanners effective to selectively operate said responsive means.

6. In a device for scanning a record on which are a plurality of sets of code marks and a guide mark associated with each of said sets, photoelectric scanners for scanning the several elements of the sets of code marks, a photoelectric scanner for successively scanning the guide marks, a train of electronic tubes successively operable in response to the scanning of successive guide marks, responsive means, electronic means for rendering the scanning of any desired set of code marks by said code mark scanners effective to selectively operate said responsive means, and switching means settable to associate the input circuit of said electronic means with the output circuit of any desired one of said train of tubes whereby scanning by said code mark scanners is rendered effective only after a predetermined number of said guide marks have been scanned.

7. In a device for scanning a record on which are a plurality of sets of code marks and a guide mark associated with each of said sets, photoelectric scanners for scanning the several elements of the sets of code marks, a photoelectric scanner for successively scanning the guide marks, a train of electronic tubes successively operable in response to the scanning of successive guide marks, responsive means, electronic means for rendering the scanning of any desired set of code marks by said code mark scanners effective to selectively operate said responsive means comprising a source of current connected to said code mark scanners, an inverter tube normally effective to shunt current away from said scanners and an amplifier tube whose output circuit is associated with the input circuit of said inverter tube, and a switching means settable to associate the input circuit of said amplifier tube with the output circuit of any desired one of said train of tubes whereby said amplifier tube is controlled to reduce the shunting effect of said inverter tube to render scanning by said code mark scanners effective only after a predetermined number of said guide marks have been scanned.

8. In a device for scanning a record on which are a plurality of sets of code marks and a guide mark associated with each of said sets, photoelectric scanners for scanning the several elements of the sets of code marks, an amplifying means associated with each of said photoelectric scanners, relays associated respectively with said amplifying means and selectively operable in accordance with the selective sensitizing of said code mark scanners, a photoelectric scanner for successively scanning the guide marks, a train of electron tubes successively operable in response to the scanning of successive guide marks, a switching means having its fixed terminals connected respectively to the output circuits of successive ones of said electronic tubes, and means associated with the adjustable member of said switching means and operable from said train of tubes in accordance with the setting of said switching means for rendering said code mark scanners effective to selectively control said amplifying means in response to scanning any desired set of said code marks.

9. In a device for scanning a record on which are a plurality of sets of code marks and a guide mark associated with each of said sets, photoelectric scanners for scanning the several elements of the sets of code marks, an amplifying means associated with each of said photoelectric scanners, relays associated respectively with said amplifying means and selectively operable in accordance with the selective sensitizing of said code mark scanners, a photoelectric scanner for successively scanning the guide marks, a train of electronic tubes successively operable in response to the scanning of successive guide marks, a switching means having its fixed terminals connected respectively to the output circuits of successive ones of said electronic tubes, means associated with the adjustable member of said switching means and operable from said train of tubes in accordance with the setting of said switching means for rendering said code mark scanners effective to selectively control said amplifying means in response to scanning any desired set of code marks, and means operable by said relays for rendering further scanning by said code mark scanners ineffective to control said amplifying means.

ROBERT F. MASSONNEAU.

REFERENCES CITED

The following references are of record in the file of this patent:

UNITED STATES PATENTS

| Number | Name | Date |
|---|---|---|
| 2,172,330 | Bryce | Sept. 5, 1939 |